(12) United States Patent
Zhang et al.

(10) Patent No.: US 11,281,468 B2
(45) Date of Patent: Mar. 22, 2022

(54) INSTRUCTION EXECUTION METHOD AND INSTRUCTION EXECUTION DEVICE

(71) Applicant: Shanghai Zhaoxin Semiconductor Co., Ltd., Shanghai (CN)

(72) Inventors: Zhi Zhang, Beijing (CN); Penghao Zou, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/212,194

(22) Filed: Mar. 25, 2021

(65) Prior Publication Data
US 2021/0208893 A1 Jul. 8, 2021

Related U.S. Application Data

(63) Continuation-in-part of application No. 16/583,514, filed on Sep. 26, 2019, now Pat. No. 10,990,406.

(30) Foreign Application Priority Data

Jun. 12, 2019 (CN) .......................... 201910504891.7
Jul. 24, 2020 (CN) .......................... 202010721141.8

(51) Int. Cl.
*G06F 9/38* (2018.01)
*G06F 9/30* (2018.01)
*G06F 9/22* (2006.01)

(52) U.S. Cl.
CPC ............ *G06F 9/3855* (2013.01); *G06F 9/226* (2013.01); *G06F 9/30101* (2013.01); *G06F 9/3861* (2013.01)

(58) Field of Classification Search
None
See application file for complete search history.

(56) References Cited

U.S. PATENT DOCUMENTS

| 7,047,394 | B1* | 5/2006 | Van Dyke ........... G06F 9/30123 712/E9.035 |
| 9,501,286 | B2 | 11/2016 | Col et al. |
| 2009/0204800 | A1* | 8/2009 | Hooker ................. G06F 9/3838 712/245 |
| 2010/0070741 | A1* | 3/2010 | Col ..................... G06F 9/30174 712/E9.005 |
| 2010/0299504 | A1 | 11/2010 | Henry et al. |
| 2013/0311755 | A1* | 11/2013 | Henry ..................... G06F 1/324 712/226 |
| 2013/0339668 | A1 | 12/2013 | Ould-Ahmed-Vall et al. |

* cited by examiner

*Primary Examiner* — Michael Sun
(74) *Attorney, Agent, or Firm* — McClure, Qualey & Rodack, LLP

(57) ABSTRACT

An instruction execution method includes the following steps: translating a macro-instruction into a first micro-instruction and a second micro-instruction, and marking first binding information on the first micro-instruction, and marking second binding information on the second micro-instruction; and simultaneously retiring the first micro-instruction and the second micro-instruction according to the first binding information and the second binding information. The first micro-instruction and the second micro-instruction are adjacent to one another in the micro-instruction storage space.

24 Claims, 8 Drawing Sheets

Mop — VMULPD ymm1{k1}{z},ymm2,ymm3/m256/m64bcst{er}

FIG. 2A

μop1 — Mulpd ymm1, ymm2, ymm3; // u-op1

μop2 — Mulpd xmm1, xmm2, xmm3; // u-op2

FIG. 2B

INSTRUCTION EXECUTION METHOD AND INSTRUCTION EXECUTION DEVICE

CROSS REFERENCE TO RELATED APPLICATIONS

This application is a Continuation-In-Part of pending U.S. non-provisional patent application Ser. No. 16/583,514, filed on Sep. 26, 2019, which claims priority of China Patent Application No. 201910504891.7, filed on Jun. 12, 2019, and the entirety of which is incorporated by reference herein. This application also claims priority of China Patent Application No. 202010721141.8, filed on Jul. 24, 2020 and entitled "INSTRUCTION EXECUTION METHOD AND INSTRUCTION EXECUTION DEVICE", the entirety of which is incorporated by reference herein.

BACKGROUND OF THE INVENTION

Field of the Invention

The present disclosure relates to a mechanism for executing instructions and, in particular, to an instruction execution method and an instruction execution device for executing micro-instructions with atomicity.

Description of the Related Art

In general, the data bus in the execution unit of a processor has a fixed bit width. For example, it may be 128 bits, meaning that the widest data width of the data that can be calculated is limited to 128 bits. However, with the development of technology, especially in the field that requires a lot of processing of floating point instructions or vector instructions, the bit width of the data that a processor needs to process has become increasingly wider, and the instructions are getting increasingly complex. The processor may need to process data with more bits, such as a data with 256 bits or even 512 bits.

Therefore, how to effectively expand the command types that can be processed based on the current processor architecture, and how to support the output results with more bits, have become two of the problems to be solved in the field.

BRIEF SUMMARY OF THE INVENTION

In order to solve the above problems, this disclosure proposes an instruction execution method and an instruction execution device.

In accordance with one feature of the present invention, the present disclosure provides an instruction execution method that includes the following steps: translating a macro-instruction into a first micro-instruction and a second micro-instruction; marking first binding information on the first micro-instruction; marking second binding information on the second micro-instruction; and simultaneously retiring the first micro-instruction and the second micro-instruction according to the first binding information and the second binding information. The first micro-instruction and the second micro-instruction are adjacent to one another in the micro-instruction storage space.

In accordance with one feature of the present invention, the present disclosure provides an instruction execution device. The instruction execution device includes an instruction translator and a reorder buffer. The instruction translator is configured to translate a macro-instruction into a first micro-instruction and a second micro-instruction. The instruction translator is configured to mark first binding information on the first micro-instruction, and to mark second binding information on the second micro-instruction. The reorder buffer is configured to simultaneously retire the first micro-instruction and the second micro-instruction according to the first binding information and the second binding information. The first micro-instruction and the second micro-instruction are adjacent to one another in the micro-instruction storage space.

Using the above-mentioned instruction execution device and instruction execution method, macro-instructions can be decoded into multiple micro-instructions (operation micro-instructions), without the need to generate additional micro-instructions. For example, the above-mentioned instruction execution device and instruction execution method only need to decode a 256-bit macro-instruction into two 128-bit operation micro-instructions without the need to generate additional micro-instructions. Therefore, this instruction execution method can reduce the execution time of the instruction execution device, thereby reducing power consumption.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIGS. 2A-2B are schematic diagrams of an instruction execution method in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
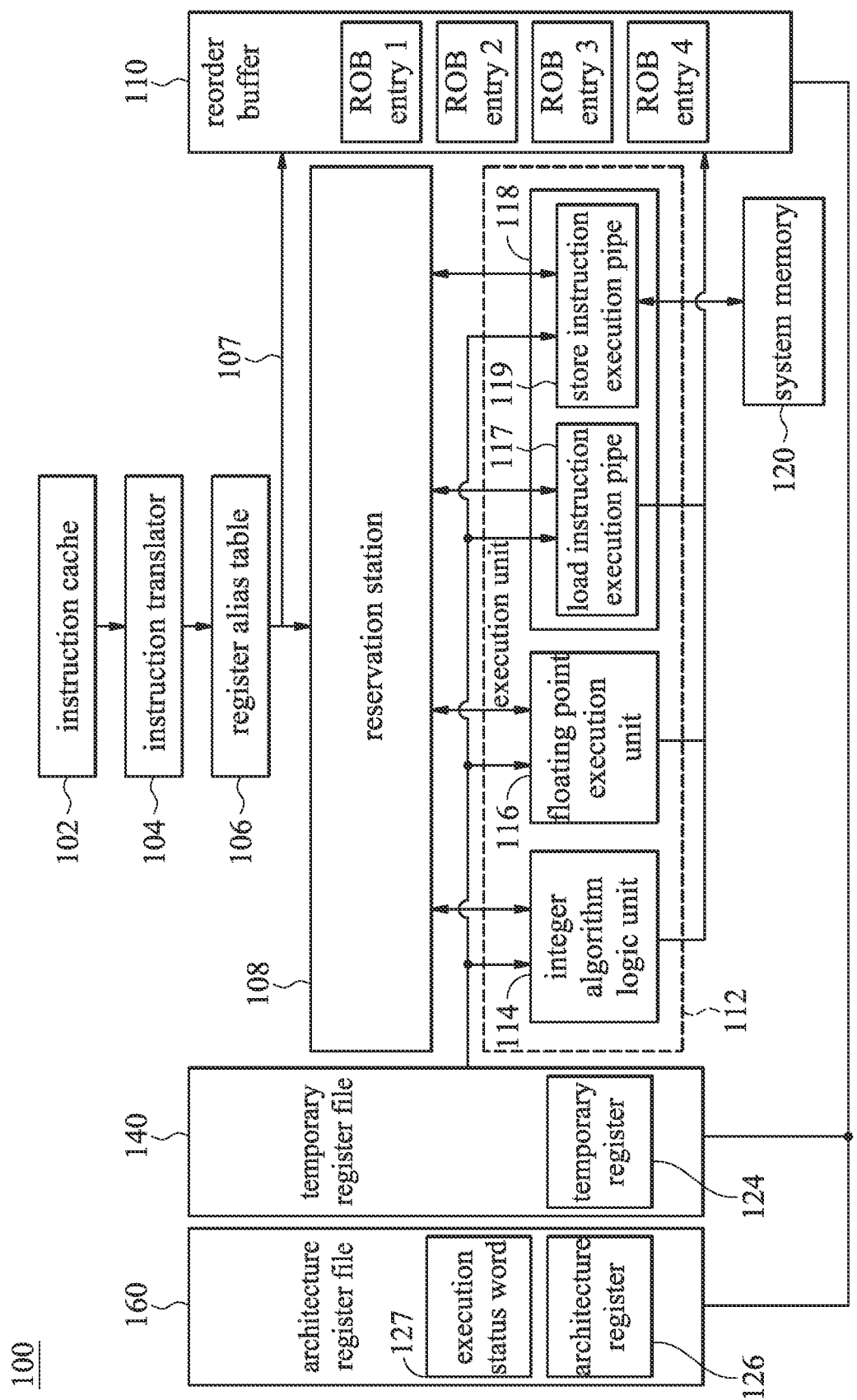
FIG. 1 is a block diagram of an instruction execution device in accordance with one embodiment of the present disclosure.

In one embodiment, please refer to FIG. 1. FIG. 1 is a block diagram of an instruction execution device 100 in accordance with one embodiment of the present disclosure. In one embodiment, the instruction execution device 100 includes an instruction translator 104 and an execution unit 112. The instruction translator 104 receives a macro-instruction and translates the macro-instruction into a first micro-instruction, a second micro-instruction and a third micro-instruction. The instruction translator 104 marks the first micro-instruction and the second micro-instruction with the same atomic operation flag. The execution unit 112 executes the first micro-instruction to generate a first execution result, and stores the first execution result in a temporary register 124 (for example, the temporary register 124 of one of multiple temporary registers in temporary register file 140). The execution unit 112 executes the second micro-instruction to generate a second execution result, and stores the second execution result in the architecture register 126 (for example, the architecture register 126 of one of multiple architecture registers in architecture register file 160). And the execution unit 112 executes the third micro-instruction to read the first execution result from the temporary register 124 and store the first execution result into the architecture register 126. The architecture register file 160 also includes an execution status word 127. The execution status word 127 is used to store exceptions that occurred during execution of instructions (detailed later).

In one embodiment, the instruction execution device 100 can be a processor. In addition, the processor can be implemented by using an integrated circuit, such as a microcontroller, a microprocessor, a digital signal processor, an application specific integrated circuit (ASIC), or a logic circuit.

In one embodiment, as shown in FIG. 1, the instruction execution device 100 (for example, implemented by a microprocessor) includes an instruction cache 102. The instruction cache 102 stores macro-instruction of instruction set architecture, such as an x86 instruction set architecture. In addition, the instruction translator 104 receives macro-instruction and translates it into micro-instructions (or μop). Then, micro-instructions are provided to a register alias table (RAT) 106. The register alias table 106 marks the dependency of the micro-instruction in the form of a reorder buffer index (ROB index) or a physical register file index (PRF index). The dependency refers to which instruction the destination operand of an instruction whose source operand depends on. For example, the source operand of the subsequent arithmetic logic unit (ALU) instruction can depend on the target operand of the previous loaded instruction. The dependencies are determined by the program (or the instruction sequence itself). The register alias table 106 then issues micro-instructions to the reservation station (RS) 108 in program order and issues micro-instructions to the reorder buffer (ROB) 110 via the instruction path 107. The micro-instruction (ISSUE INST) issued from the register alias table 106 can generally be referred to as a micro-instruction. The reorder buffer 110 stores each instruction issued from the register alias table 106 into a reorder buffer entry, that is, the reorder buffer entries includes ROB entry 1, ROB entry 2, ROB entry 3, ROB entry 4. etc. The ROB entry 1 is in front of ROB entry 2, ROB entry 2 is in front of ROB entry 3, ROB entry 3 is in front of ROB entry 4, and so on. If all reorder buffer entries are empty, then the reorder buffer 110 stores the received first micro-instruction in ROB entry 1, stores the received second micro-instruction in ROB entry 2, stores the received third micro-instruction in ROB entry 3, and stores the received fourth micro-instruction in ROB entry 4. The first instruction entry, the second instruction entry, the third instruction entry, and the fourth instruction entry are respectively used to store the first micro-instruction, the second micro-instruction, the third micro-instruction, and the fourth micro-instruction in the order of program execution. The reservation station 108 dispatches the operand-ready instruction to an appropriate one of the plurality of execution units 112 for execution. Among them, whether the operand is ready can be judged by whether or not the aforementioned dependency flag is released.

The execution units 112 can include one or more integer execution units, such as integer algorithm logic unit 114, one or more floating point execution units 116, a memory order buffer (MOB) 118, and the like. The memory order buffer 118 typically processes memory type instructions that access the system memory 120. The memory order buffer 118 includes a load instruction execution pipe 117 and a store instruction execution pipe 119. The system memory 120 can connect with the memory order buffer 118 via a data cache (e.g., L2 data cache, not shown) and a bus interface unit (BIU, not shown). The execution unit 112 provides their results to the reorder buffer 110, which ensures that the instructions are retired in order.

The reservation station 108 includes at least one register queue (RS queue or RS matrix). When the instruction is ready to be executed (all operands of the instruction are ready and all dependencies are removed), the corresponding instruction is dispatched by the register queue to the corresponding execution unit 112.

It should be noted that the register alias table 106 and its previous micro-instructions are executed sequentially (the instructions are executed in the order of the program), and the subsequent reserved stations 108 and execution units 112 are executed out of order: the micro-instruction in the reserved station 108 whose operands are all ready is first dispatched to the execution unit 112 for execution (while there are a plurality of prepared micro-instructions, then the longest time existing in the reservation station 108 one is selected: That is, "the oldest" micro-instruction is selected). Therefore, the program sequence is out of order at these stages, and the reorder buffer 110 ensures that the micro-instructions after execution are sequentially retired in the program order. Please refer to FIGS. 2A-2B, FIGS. 2A-2B are schematic diagrams of an instruction execution method in accordance with one embodiment of the present disclosure. In one embodiment, the execution unit 112 can obtain a 128-bit execution result output by performing the operation once. When the execution unit 112 wants to support the 256-bit macro-instruction Mop, it needs to operate twice to obtain the 256-bit execution result output. For example, when the instruction translator 104 receives the macro-instruction Mop, the instruction translator 104 translates the macro-instruction Mop into a first micro-instruction µop1 and a second micro-instruction µop2 (as shown in FIG. 2B). The first micro-instruction µop1 and the second micro-instruction µop2 are 128-bit micro-instructions. Therefore, after translating the 256-bit macro-instruction Mop into two 128-bit micro-instructions (the first micro-instruction µop1 and the second micro-instruction µop2), the execution unit 112 executes two 128-bit micro-instructions (the first micro-instruction µop1 and the second micro-instruction µop2) can obtain a 256-bit output. Thereby, the number of bits of the instruction that the execution unit 112 can process is expanded.

In one embodiment, after the instruction translator 104 receives the macro-instruction Mop, the macro-instruction Mop can be translated into more micro-instructions (for example, five micro-instructions).

The instruction execution device 100 needs to be able to support data processing of more bits in more and more cases. Using the AVX256 instruction set as an example, the bit width supported by a single instruction multiple data (SIMD) register file of the instruction execution device 100 is increased to 256 bits. However, if the data bus width of the execution unit 112 is still 128 bits, it is necessary to implement one single AVX256 macro-instruction using multiple micro-instructions (for example, two µops). However, the two micro-instructions that implement the AVX256 operation (hereinafter referred to as "operation micro-instructions") need to update the same 256-bit architecture register 126 in the SIMD register file, and so if a replay or an exception occurs in one of the two operation micro-instructions during execution, and the other is executed correctly, it may be retired and the result may be submitted to update the corresponding portion of the 256-bit architecture register 126. In such cases, the 256-bit architecture register 126 will have half of the correct and half of the error state. This is not allowed by the processor specification/manual, which allows all bits of the architecture register 126 to be all correct or all incorrect, but does not allow for such an unsure indeterminate state. Therefore, the present invention proposes to mark the same atomic operation flag as "operation micro-instructions" (for example, the aforementioned first and second micro-instructions) corresponding to the same macro-instruction to represent the fact that the first destination operand of the first micro-instruction and the second destination operand of the second micro-instruction are directed to the same architecture register 126 for subsequent processing when one of the operation micro-instructions causes an execution exception to occur (described in more detail below).

Figure 3:
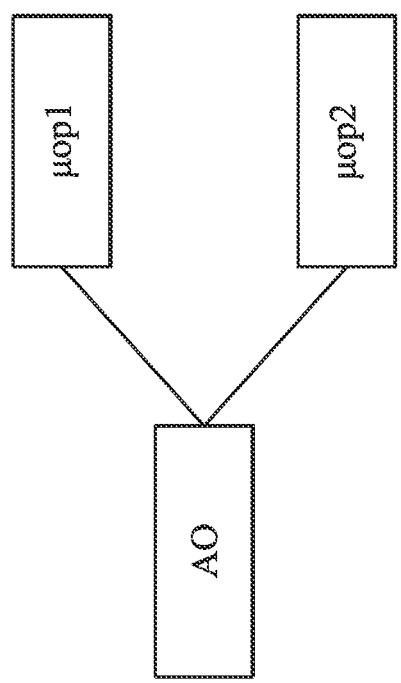
FIG. 3 is a schematic diagram of an instruction execution method in accordance with one embodiment of the present disclosure.

Please refer to FIG. 2A to FIG. 2B and FIG. 3 together. FIG. 3 is a schematic diagram of an instruction execution method in accordance with one embodiment of the present disclosure. The instruction translator 104 marks the first micro-instruction µop1 and the second micro-instruction µop2 by the same atomic operation flag. FIG. 3 is used to represent an atomic operation AO, and the atomic operation AO can be understood as a macro-instruction. For example, the macro-instruction Mop can be disassembled into the first micro-instruction µop1 and the second micro-instruction µop2. In other words, the same atomic operation flag represents the first destination operand of the first micro-instruction and the second destination operand of the second micro-instruction all point to the same architecture register 126. In one embodiment, the atomic operation flag is marked on the first reorder buffer entry (ROB entry) 1 and the second reorder buffer entry (ROB entry) 2 in the reorder buffer 110 respectively corresponding to the first micro-instruction µop1 and the second micro-instruction µop2. In one embodiment, it is defined that more than two micro-instructions (e.g., the first micro-instruction µop1 and the second micro-instruction µop2) are regarded as a set of atomic operation AO. Since the execution unit 112 needs to execute two 128-bit micro-instructions (the first micro-instruction µop1 and the second micro-instruction µop2) to obtain a 256-bit output, the correlation between the first micro-instruction µop1 and the second micro-instruction µop2 is very strong. Sometimes the execution unit 112 will execute instructions out of order. For example, after the execution unit 112 executes the first micro-instruction µop1, a plurality of other micro-instructions are executed. Then, the second micro-instruction µop2 is executed. In such cases, it is easy to cause the parameter of the second micro-instruction µop2 to be incorrect, and the execution result is also wrong. Therefore, the micro-instructions belonging to the same atomic operation AO (for example, the first micro-instruction µop1 and the second micro-instruction µop2) need to be processed specially according to the atomic operation flag when these micro-instructions occur the event of replay, retire, and exception during execution. The following taking FIG. 3 as an example to describe the detailed description of the instruction execution method of an embodiment with respect to the replay, retire, and exception processing according to the aforementioned atomic operation flag. It should be noted that, in this embodiment, the execution results of the first micro-instruction µop1 and the second micro-instruction µop2 are directly used to update the architecture register 126 after the first micro-instruction µop1 and the second micro-instruction µop2 are retired, respectively.

In one embodiment, when an exception occurs during the execution of the first micro-instruction µop1 (including de-normal exception, an invalid exception, a zero divide exception, a precision exception, an underflow exception, or an overflow exception, etc.), the exception condition is marked to the first reorder buffer entry (ROB entry) 1 of the micro-instruction µop1, and the first micro-instruction µop1 is not retired, until the second micro-instruction µop2 having the same atomic operation flag as the first micro-instruction µop1 is executed and when the first micro-instruction µop1 is the oldest in the reorder buffer 110 (i.e., at that time, the reorder buffer 110 should execute the retire procedure of the first micro-instruction µop1 in order), an exception handler corresponding to the exception of the first micro-instruction µop1 is performed. It is worth noting that the reason for waiting for the end of the execution of the second micro-instruction µop2 is: an execution status word 127 will be updated when the execution of the second micro-instruction µop2 ends. The instruction translator 104 needs to decide which exception handler to execute based on the value of the execution status word 127. When the exception handler corresponding to the exception of the first micro-instruction µop1 is completed, the first micro-instruction µop1 and the second micro-instruction µop2 are decoded again by the instruction translator 104. After the first micro-instruction µop1 and the second micro-instruction µop2 are executed without any error, the first micro-instruction µop1 and the second micro-instruction µop2 can be retired when they are the oldest respectively. In this embodiment, the reorder buffer 110 determines that the second micro-instruction μop2 needs to be bound to the first micro-instruction μop1 according to the same atomic operation flag to perform the foregoing exception handler.

In one embodiment, when the execution of the first micro-instruction μop1 is normal, the first micro-instruction μop1 cannot be retired temporarily, and the second micro-instruction μop2 causes an exception, since the first micro-instruction μop1 has the same atomic operation flag as the second micro-instruction μop2, the exception condition is marked to the first reorder buffer entry (ROB entry) 1 of the first micro-instruction μop1. When the first micro-instruction μop1 is the oldest in the reorder buffer 110, an exception handler corresponding to the exception of the second micro-instruction μop2 is performed. When the exception handler corresponding to the exception of the second micro-instruction μop2 is completed, the first micro-instruction μop1 and the second micro-instruction μop2 are decoded again by the instruction translator 104, and the execution of the first micro-instruction μop1 and the second micro-instruction μop2 is completed without any error, the first micro-instruction μop1 and the second micro-instruction μop2 can be retired when they are the oldest respectively.

In one embodiment, some execution errors don't require the micro-instructions to be decoded again by the instruction translator 104, and the micro-instructions can be executed again by the execution unit 112 to obtain the correct execution result. This kind of operation is called "replay". In one embodiment, when the execution result of the first micro-instruction μop1 is wrong, the execution unit 112 starts to perform a replay from the first micro-instruction μop1: That is, the execution unit re-executes the first micro-instruction μop1 and its subsequent micro-instructions (including re-executing the second micro-instruction μop2). In one embodiment, when the execution result of the first micro-instruction μop1 is correct and the execution result of the second micro-instruction μop2 is wrong, since the second micro-instruction μop2 has the same atomic operation flag as the first micro-instruction μop1, the reorder buffer 110 does not perform the retire of the first micro-instruction μop1 but perform the replay of the second micro-instruction μop2 when the first micro-instruction μop1 is oldest. After the execution unit 112 re-executes the second micro-instruction μop2 and its subsequent micro-instructions, the reorder buffer 110 can retire the first micro-instruction μop1.

It should be noted that, in the embodiment described in FIG. 3, the first micro-instruction μop1 cannot retire when the execution result of the first micro-instruction μop1 is correct because an error occurs in the second micro-instruction μop2 having its atomicity. Therefore, the present invention further proposes the embodiments of FIG. 4 and FIG. 5. A macro-instruction is translated into at least three micro-instructions. The at least three micro-instructions includes at least two operation micro-instructions (such as a first micro-instruction and a second micro-instruction). When the first micro-instruction is executed correctly, the first micro-instruction can be retired but the architecture register 126 cannot be updated, and the result is stored in the temporary register 124. After the first micro-instruction and second micro-instruction are executed correctly, the first execution result is integrated into the architecture register 126 by the third micro-instruction from the temporary register 124. Thus, when the first micro-instruction is executed correctly, the first micro-instruction can be retired and will not cause an error in the architecture register 126, and will not waste hardware resources.

Figure 4:
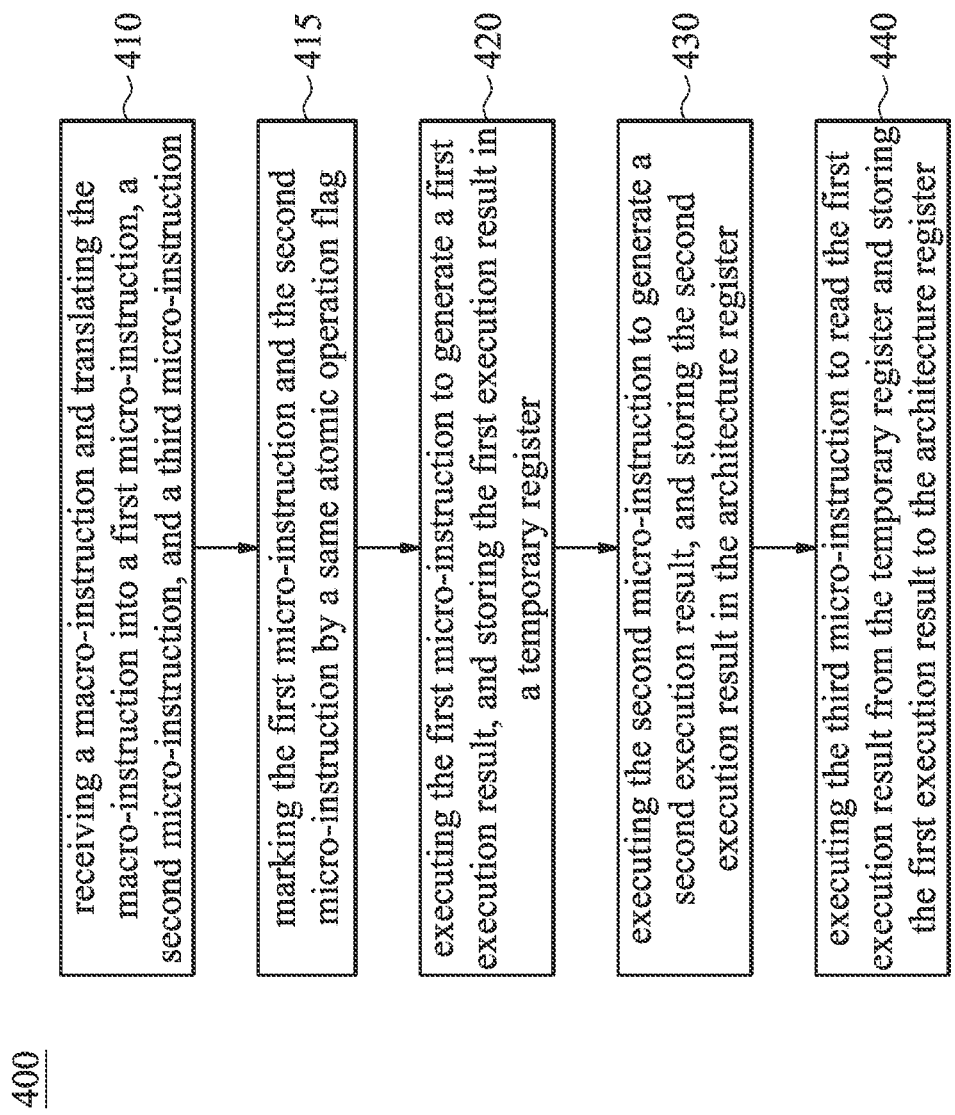
FIG. 4 is a flowchart of an instruction execution method 400 in accordance with one embodiment of the present disclosure.
Figure 5:
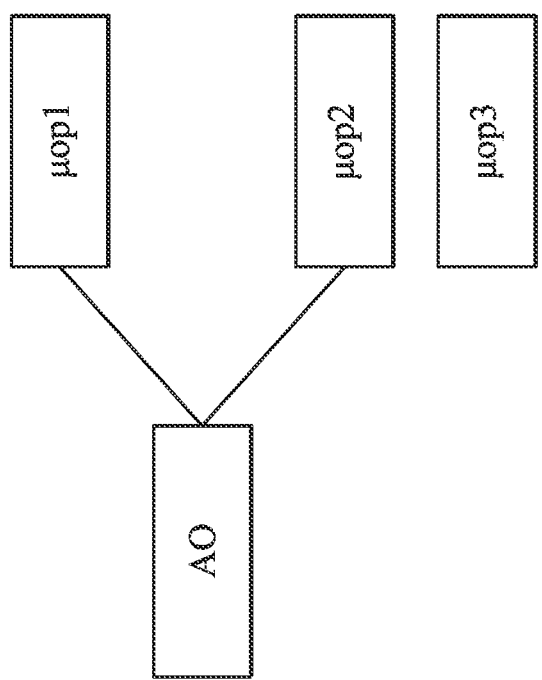
FIG. 5 is a schematic diagram of an instruction execution method in accordance with one embodiment of the present disclosure.

Please refer to FIG. 4 to FIG. 5. FIG. 4 is a flowchart of an instruction execution method 400 in accordance with one embodiment of the present disclosure. FIG. 5 is a schematic diagram of an instruction execution method in accordance with one embodiment of the present disclosure. The instruction execution method 400 is applicable to a processor including an instruction translator 104, an execution unit 112, an architecture register 126, and a reorder buffer 110. In one embodiment, the instruction execution apparatus 100 of FIG. 1 can be applied to execute the instruction execution method 400 of FIG. 4.

In step 410, the instruction translator 104 receives a macro-instruction and translates the macro-instruction into a first micro-instruction μop1, a second micro-instruction μop2, and a third micro-instruction μop3 (as shown in FIG. 3).

In step 415, the instruction translator 104 marks the first micro-instruction and the second micro-instruction by the same atomic operation flag. The same atomic operation flag represents that the first micro-instruction μop1 and the second micro-instruction μop2 are operation micro-instructions of the same macro-instruction and have atomicity there between. In one embodiment, the atomically is represented by the first destination operand of the first micro-instruction μop1 and the second destination operand of the second micro-instruction μop2 both pointing to the same architecture register (e.g., architecture register 126 in FIG. 1).

In one embodiment, when the instruction translator 104 decodes, the instruction translator 104 marks the same atomic operation flag in a first reorder buffer entry (ROB entry) 1 and a second reorder buffer entry (ROB entry) 2 in the reorder buffer 110 corresponding to the first micro-instruction μop1 and the second micro-instruction μop2 respectively. The micro-instructions (the first micro-instruction μop1 and the second micro-instruction μop2) are represented as part of the atomic operation OA. In one embodiment, the instruction translator 104 marks the first micro-instruction μop1 with the start identifier of the atomic operation OA, and the second micro-instruction μop2 with the end identifier of the atomic operation OA. Other components of the instruction execution device 100 can know that the micro-instructions (when the macro-instruction requires three or more operation micro-instructions, for example, the decoded program sequence is sequentially performed by the first micro-instruction μop1, the fourth micro-instruction μop4, and the second micro-instruction μop2, etc., the fourth micro-instruction μop4 between the first micro-instruction μop1 and the second micro-instruction μop2 does not require to be marked) between the start identifier and the end identifier are part of the atomic operation OA.

In one embodiment, when the execution unit 112 executes a floating point instruction, if the required bandwidth of the floating point instruction is 128 bits, after the execution is completed, the execution unit 112 outputs an execution result of 128 bits and some of the identification fields into the reorder buffer entry corresponding to the floating point instruction in the reorder buffer 110. The identification field includes, for example, the aforementioned atomic operation flag, replay flag, exception flag, and related information (e.g., including a mark location, an error code, etc., which are required by the instruction translator 104 to execute the exception handler,).

In one embodiment, when the instruction translator 104 decodes, the atomic operation flag is marked in each of the reorder buffer entries of the first micro-instruction μop1 and the second micro-instruction μop2. The subsequent components (e.g., The reorder buffer 110, the execution unit 112) can also mark various error conditions in the respective reorder buffer entries of the first micro-instruction µop1 and/or the second micro-instruction µop2. In one embodiment, if the instruction cache 102, the reservation station 108, and/or the floating point execution unit 116 detect(s) the first micro-instruction µop1 and/or the second micro-instruction µop2 in their corresponding processing stages (decoding stage, launch stage and execution stage, respectively) occur(s) exception(s), the exception flag and its associated information are then marked to the entry of the corresponding micro-instruction stored in the reorder buffer 110.

In one embodiment, if the first micro-instruction µop1 and/or the second micro-instruction µop2 are detected to have a replay condition, an exception condition (with an exception condition code), or another error condition before being executed or during execution by the execution unit 112, the reorder buffer 110 can process (e.g., deal with exception conditions) micro-instructions having the same atomic operation flag in accordance with the aforementioned marking. For example, after the floating instruction execution unit 116 executes the first micro-instruction µop1, if the first micro-instruction µop1 is detected to have a first exception with its first execution result, the first exception is marked according to its atomic operation flag at a second micro-instruction µop2 with its atomicity. For example, the first exception may be marked in a reorder buffer entry of the second micro-instruction µop2. It should be noted that the first exception in the foregoing embodiment can occur after the first micro-instruction µop1 is executed by the execution unit 112, and this kind of exception can be called a post exception. The post exception is, for example, a precision exception, an underflow exception, or an overflow exception. Common exceptions further include the exceptions associated with source operands that occur before being executed by the execution unit 112, and this kind of exception can be called a pre-exception. Examples of pre-exceptions include a de-normal exception, an invalid exception, and a zero divide exception. The mark of different exceptions for different micro-instructions, as well as the mark of the replay condition of different micro-instructions, will be explained in subsequent paragraphs.

In the embodiment corresponding to FIG. 4, the reorder buffer 110 determines whether the micro-instruction in which an exception has occurred has an atomic instruction according to the atomic operation flag. If so, the exception condition of an older micro-instruction (e.g., the aforementioned first micro-instruction µop1) is marked at a younger atomic instruction (e.g., the aforementioned second micro-instruction µop2). Since the error result of the first micro-instruction µop1 is only updated into the temporary register 124 after the first micro-instruction µop1 is retired, it does not cause the state of the architecture register 126 to be indeterminate, so the older micro-instruction (for example, the first micro-instruction µop1 described above) can be retired first. When the younger atomic instruction becomes the oldest (i.e., when executing the retire procedure of the younger atomic instruction), the exception conditions of the two micro-instructions are processed together. The manner in which the exception condition is processed is, for example, but not limited to, the reorder buffer 110 transmitting a mark location and an error code of the exception result to an ucode (not shown) in the instruction translator 104. The ucode selects one of multiple exception handlers stored therein based on the mark location and the error code.

In step 420, the execution unit 112 executes the first micro-instruction µop1 to generate a first execution result, and stores the first execution result in a temporary register 124. Thereby, even if the first execution result is wrong, the architecture register 126 is not affected.

In step 430, the execution unit 112 executes the second micro-instruction µop2 to generate a second execution result, and store the second execution result in the architecture register 126.

In step 440, the execution unit 112 executes the third micro-instruction µop3 to read the first execution result from the temporary register 124 and stores the first execution result to the corresponding location in the architecture register 126.

Referring to FIG. 1 and FIG. 5 together, the first micro-instruction µop1/second micro-instruction µop2 can only update the temporary register 124/architecture register 126 only if it is successfully retired. Therefore, when an exception occurs in the first micro-instruction µop1, the first micro-instruction µop1 can be retired and the exception is marked on the second micro-instruction µop2. Therefore, when an exception occurs in the first micro-instruction µop1, the first micro-instruction µop1 can be retired and the exception can be marked on the second micro-instruction µop2. Since the retire of the first micro-instruction µop1 does not update the architecture register 126, and the second micro-instruction µop2 will execute the exception handler before retired, the error result will not be updated in the architecture register 126, thereby avoiding the problem of the architectural register 126 having an uncertain state.

In order to further demonstrate that no matter what kind of abnormal situation occurs, the instruction execution method described in this embodiment can solve the abnormal situation. The following specifically describes (1) when the first micro-instruction µop1 occurs in a pre-exception (previous exception) condition; (2) when the first micro-instruction µop1 occurs in the post exception condition; (3) when the first micro-instruction µop1 is correctly executed and retired successfully, the second micro-instruction µop2 causes an exception (either the pre-exception or the post exception) (4) when the first micro-instruction µop1 or the second micro-instruction µop2 needs to be replayed.

(1) When the first micro-instruction µop1 occurs in a pre-exception condition: in one embodiment, before the first micro-instruction µop1 is executed by the execution unit 112, if it is detected that at least one source operand corresponding to the first micro-instruction µop1 has a de-normal exception, an invalid exception, or a zero divide exception, then the execution unit 112 does not retire the first micro-instruction µop1 (or even does not execute the first micro-instruction µop1 at all), thereby avoiding the problem of the architectural register 126 having an uncertain state. The de-normal exception is, for example, that the format of the source operand is incorrect. The invalid exception is, for example, that the operand of the source operand is invalid or there is an un-executable error. The exception of the zero divide exception is the previous exception. These pre-exceptions can be detected before execution.

(2) When the first micro-instruction µop1 occurs in the post exception condition: as described above, there are some exceptions which are known from the execution result after the execution unit 112 executes the micro-instruction. For example, when the first execution result includes at least one exception result of a precision exception, an underflow exception, or an overflow exception, the exception is called the post exception. The execution unit 112 marks at least one post exception (hereinafter referred to as the first exception) of the first micro-instruction µop1 to the second micro-instruction µop2 according to the atomic operation flag. In one embodiment, the execution unit 112 marks the first exception to the second reorder buffer entry (ROB entry) 2 corresponding to the second micro-instruction μop2 in the reorder buffer 110. The reorder buffer 110 can retire the first micro-instruction μop1 when entry index of the first micro-instruction μop1 in the reorder buffer 110 becomes the oldest. When entry index of the second micro-instruction μop2 in the reorder buffer 110 becomes the oldest (i.e., when the retire procedure of the second micro-instruction μop2 is to be executed in sequence), the reorder buffer 110 temporarily does not retire the second micro-instruction μop2. Instead, a mark location and an error code corresponding to the first exception described above are sent to the instruction translator 104. In addition to this, the instruction translator 104 executes an exception handler corresponding to the mark location and the error code. It is worth noting that when the first micro-instruction μop1 has the first exception and the second micro-instruction also has an exception (either the pre-exception or the post exception, which is referred to as the second exception), the execution unit 112 can still mark the first exception on the second micro-instruction μop2 when the first exception is detected. When the second exception is detected, it is also marked in the second micro-instruction μop2. The reorder buffer 110 can first retire the first micro-instruction μop1. When the reorder buffer 110 executes the retire procedure of the second micro-instruction μop2 in order, the first and second exceptions can be synthesized to compare whose corresponding micro-instruction is older, and the mark location and error code of the order one are passed to the instruction translator 104 to execute the corresponding exception handler. In such cases, the first micro-instruction μop1 is older than the second micro-instruction μop2, so the mark position and the error code of the aforementioned first exception are still passed to the instruction translator 104.

(3) When the first micro-instruction μop1 is correctly executed and retired successfully, the second micro-instruction μop2 causes an exception (either the pre-exception or the post exception): when the first micro-instruction μop1 is detected as a normal result after being executed by the execution unit 112, and the second micro-instruction μop2 is detected causing a second exception, the reorder buffer 110 retires the first micro-instruction μop1 (when the entry index of the first micro-instruction μop1 is the oldest in the reorder buffer 110). The reorder buffer 110 does not update the architecture register 126. In such cases, the second exception can be the pre-exception, such as including a de-normal exception, an invalid exception, or a zero divide exception. The second exception also can be the post exception, such as including a precision exception, an underflow exception, or an overflow exception. In one embodiment, the reorder buffer 110 temporarily does not retire the second micro-instruction μop2 (when the entry index of the second micro-instruction μop2 is the oldest in the reorder buffer 110). The reorder buffer 110 transmits a mark location and an error code corresponding to the second exception to the instruction translator 104. The instruction translator 104 executes an exception handler that corresponds to the mark location and the error code.

Based on the description above, in the embodiment corresponding to FIG. 4 and FIG. 5, the reorder buffer 110 cannot retire the first micro-instruction μop1 only when the first micro-instruction μop1 occurs the pre-exception (as in the previous condition (1)). In other cases, the reorder buffer 110 can first retire the first micro-instruction μop1. More specifically, when the first execution result occurs a post exception (such as a precision exception, an underflow exception, or an overflow exception) or the second execution result occurs any type of exceptions (such as a de-normal exception, an invalid exception, a zero divide exception, a precision exception, an underflow exception, or an overflow exception), the reorder buffer 110 can retire the first micro-instruction μop1 and not update architecture register 126, and mark these exception conditions in second micro-instruction μop2. When the reorder buffer 110 is ready to perform retiring of the second micro-instruction μop2 (when the second micro-instruction μop2 is the oldest in the reorder buffer 110), the second micro-instruction μop2 is temporarily not retired. The reorder buffer 110 performs the exception handler according to the marks carried by the second micro-instruction μop2. For example, the reorder buffer 110 transmits the mark location and the error code to the instruction translator 104 according to the marks carried by the second micro-instruction μop2. The instruction translator 104 executes the exception handler that corresponds to the mark location and the error code.

(4) When the first micro-instruction μop1 or the second micro-instruction μop2 needs to be replayed: the following discusses the execution error for situations that replay are required. When the first execution result causes error and requires to be replayed, the execution unit 112 re-executes the first micro-instruction μop1 and all subsequent micro-instructions. When the first execution result is correct, but the second execution result causes error and requires replay, the execution unit 112 re-executes the second micro-instruction μop2 and all subsequent micro-instructions. This embodiment different from the embodiment of FIG. 3 is that the first micro-instruction μop1 in this example can be retired first without waiting for the replay execution of the second micro-instruction μop2 having its atomicity. In the embodiment of FIG. 3, the reorder buffer 110 cannot perform the retire operation of the first micro-instruction μop1 when the first micro-instruction μop1 is the oldest, but instead the reorder buffer 110 performs the replay of the second micro-instruction μop2 when the first micro-instruction μop1 is the oldest.

It should be noted that when decoding the macro-instruction, the instruction translator 104 of the present invention does not limit that the number of "operation micro-instructions" for implementing the macro-instruction is two. In other embodiments, the macro-instruction can be translated into N (N≥2) operation micro-instructions as needed. The execution results of the front (N−1) operation micro-instructions are respectively stored in (N−1) corresponding temporary registers 124. After the N operation micro-instructions are correctly executed and retired, the execution results of the (N−1) temporary registers 124 is stored in the architecture register 126 by the N+1th micro-instruction.

Based on the description above, the instruction execution method and the instruction execution device shown in FIGS. 4 and 5 of the present invention can apply the instruction translator to translate the macro-instruction into multiple micro-instructions. In addition to this, the micro-instructions for implementing the macro-instruction (such as the first and second micro-instructions described above) are marked with the same atomic operation flag. Therefore, the macro-instruction can be divided into multiple atomic micro-instructions with atomicity for processing. In addition to this, the operation results of the first and second micro-instruction are integrated by the third micro-instruction. According to the embodiments of the present invention, while extending the number of output bits that can be processed by the instruction execution device, the atomic operation flag can be used to mark certain types of exceptions occurred during the processing of the first micro-instruction onto the second micro-instruction with atomicity. Since the architecture register corresponding to the execution result of the first micro-instruction is not updated, the first micro-instruction can flexibly retire first, without causing an error in the architecture register. This increases the flexibility and the correctness of dividing a macro-instruction into multiple micro-instructions for operation.

Based on the information provided above, compared with the instruction execution method shown in FIG. 3 of the present invention, the instruction execution method shown in FIGS. 4 and 5 of the present invention, when the instruction translator 104 decodes the macro-instruction, in addition to generating the operation micro-instruction corresponding to the macro-instruction, an additional micro-instruction for storing the execution result of the operation micro-instruction from the temporary register 124 to the architectural register 126 is required. The instruction execution device 100 needs to use extra time to execute this extra micro-instruction, thus increasing the running time and power consumption. The instruction execution method shown in FIG. 3 of the present invention only needs to generate operation micro-instructions, and does not need to generate additional micro-instructions and take up additional execution time of the instruction execution device 100. Therefore, running time can be saved, thereby reducing power consumption. The instruction execution method shown in FIG. 3 is described in more detail below in conjunction with FIG. 6, FIG. 7A and FIG. 7B.

Figure 6:
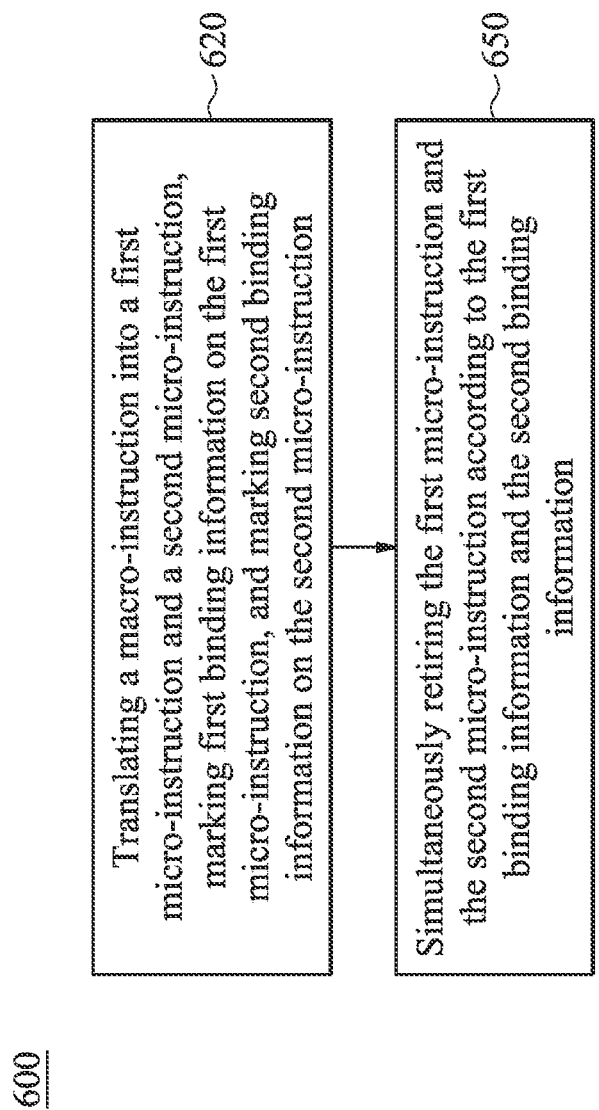
FIG. 6 is a flowchart of an instruction execution method 600 in accordance with one embodiment of the present disclosure.

Please refer to FIG. 6, FIG. 6 is a flowchart of an instruction execution method 600 in accordance with one embodiment of the present disclosure. The instruction execution method 600 can be run in the instruction execution device 100 and the instruction execution method 600 includes: translating a macro-instruction into a first micro-instruction and a second micro-instruction, marking first binding information on the first micro-instruction, and marking second binding information on the second micro-instruction (step 620); simultaneously retiring the first micro-instruction and the second micro-instruction according to the first binding information and the second binding information (step 650). The first micro-instruction and the second micro-instruction are adjacent to one another in the micro-instruction storage space. The micro-instruction storage space is the reorder buffer 110. The reorder buffer entry storing the first micro-instruction is adjacent to the reorder buffer entry storing the second micro-instruction in the reorder buffer 110, and the reorder buffer entry storing the first micro-instruction precedes the reorder buffer entry storing the second micro-instruction. The instruction execution method 600 is described in detail below. First, step 620 is performed.

In step 620, the instruction translator 104 translates a macro-instruction into a first micro-instruction μop1 and a second micro-instruction μop2, marks first binding information on the first micro-instruction μop1, and marks second binding information on the second micro-instruction μop1. Specifically, after receiving a macro-instruction, the instruction translator 104 translates the macro-instruction into a first micro-instruction μop1 and a second micro-instruction μop2, marks a first binding information on the first micro-instruction μop1, and marks a second binding information on the second micro-instruction μop2. The first micro-instruction μop1 and the second micro-instruction μop2 are operation micro-instructions. The first binding information and the second binding information are the atomic operation flags described above, which are used to bind the first micro-instruction μop1 and the second micro-instruction μop2 into one atomic operation. That is, the first binding information and the second binding information indicate that the first destination operand of the first micro-instruction and the second destination operand of the second micro-instruction all point to the same architecture register 126. The first destination operand and the second destination operand respectively point to the first regionregion and the second regionregion of the architecture register 126. The first regionregion and the second regionregion do not overlap. For example, taking the 256-bit architectural register 126 as an example, the lower 128 bits and upper 128 bits of the architectural register 126 are respectively the first regionregion and the second regionregion (the lower 128 bit and upper 128 bit of the architectural register 126 do not overlap, that is, the first region and the second region do not overlap). The first destination operand points to the first region of the architectural register 126, and the second destination operand points to the second region of the architectural register 126.

In another embodiment, when the bit width of the destination operand of the macro-instruction in the instruction execution device 100 is not an integer multiple of the bit width of the destination operand of the micro-instruction, when the instruction translator 104 translates the macro-instruction into a first micro-instruction μop1 and a second micro-instruction μop2, the first destination operand of the first micro-instruction μop1 points to the first region of the architectural register 126, and the second destination operand of the two micro-instruction μop2 points to the second region of the architectural register 126. There can be two relationships between the first region and the second region: the first region and the second region do not overlap, and the first region and the second region partially overlap. When the first region and the second region do not overlap, there are three situations: the bit width of the first region is equal to the bit width of the second region, the bit width of the first region is greater than the bit width of the second region, and the bit width of the first region is smaller than the bit width of the second region. When the first region and the second region partially overlap, there are three cases: the bit width of the first region is equal to the bit width of the second region, the bit width of the first region is greater than the bit width of the second region, and the bit width of the first region is smaller than the bit width of the second region.

The following is an example for the description that the bit width of the destination operand of the macro-instruction is 256 bits, and the bit width of the destination operand of the micro-instruction is 192 bits. When the instruction translator 104 translates the macro-instruction into a first micro-instruction μop1 and a second micro-instruction μop2, the three situations when the first region and the second region do not overlap are: the first region is the lower 128 bits of the architecture register 126, the second region is the higher 128 bits of the architecture register 126; the first region is the lower 192 bits of the architecture register 126, the second region is the higher 64 bits of the architecture register 126; the first region is the lower 64 bits of the architectural register 126, the second region is the higher 192 bits of the architectural register 126. The three situations when the first region and the second region partially overlap are: the first region is the lower 192 bits of the architecture register 126, the second region is the higher 192 bits of the architecture register 126; the first region is the lower 192 bits of the architecture register 126, the second region is the higher 128 bits of the architectural register 126; the first region is the lower 128 bits of the architectural register 126, and the second region is the higher 192 bits of the architectural register 126.

In addition, it is worth noting that when the bit width of the destination operand of the macro-instruction in the instruction execution device 100 is an integer multiple of the bit width of the destination operand of the micro-instruction, in general, the number of micro-instructions translated by the instruction translator 104 is a multiple of the bit width of the destination operand of the macro-instruction and the bit width of the destination operand of the micro-instruction. For example, when the multiple of the bit width of the destination operand of the macro-instruction (such as 256 bits) and the destination operand of the micro-instruction (such as 128 bit) is 2, the macro-instruction is translated into two micro-instructions. However, the present invention is not limited thereto. In one embodiment, when the multiple of the bit width of the destination operand of the macro-instruction and the bit width of the destination operand of the micro-instruction is 2, the instruction translator 104 translates one macro-instruction into three micro-instructions. For example, the instruction translator 104 translates a 256-bit macro-instruction into 3 micro-instructions, the destination operand of the first micro-instruction points to the first region of the architecture register 126, the destination operand of the second micro-instruction points to the second region of the architecture register 126, and the destination operand of the third micro-instruction points to the third region of the architectural register 126. The first region is the lower 64 bits of the architectural register 126, the second region is the middle 128 bits of the architectural register 126, and the third region is the higher 64 bits of the architectural register 126.

The binding information is explained below.

In one embodiment, for example, the binding information includes independent binding information, first binding information, intermediate binding information, and second binding information. Binary numbers "00", "01", "10" and "11" can be used to represent independent binding information, first binding information, intermediate binding information, and second binding information, respectively. The meaning of each binding information is shown in Table 1 below:

TABLE 1

| binding information | meaning |
| --- | --- |
| 00 | representing independent binding information, used for independent micro-instructions |
| 01 | representing the first binding information, used for the first micro-instruction of the same macro-instruction |
| 10 | representing intermediate binding information, used for micro-instructions in the middle of the same macro-instruction |
| 11 | representing the second binding information, used for the last micro-instruction of the same macro-instruction |

In one embodiment, the instruction translator 104 translates a macro-instruction into a first micro-instruction and a second micro-instruction. For example, the instruction translator 104 translates a 256-bit macro-instruction into two 128-bit micro-instructions (operation micro-instructions). According to the definition in Table 1, the first micro-instruction is marked with the first binding information (represented by the binary "01", indicating that the first micro-instruction is the first micro-instruction in the program execution order of the macro-instruction), the second micro-instruction is marked with a second binding information (represented by binary "11", indicating that the second micro-instruction is the last micro-instruction in the program execution order of the macro-instruction). The first binding information and the second binding information indicate that the first destination operand of the first micro-instruction and the second destination operand of the second micro-instruction both point to the same architecture register 126.

In one embodiment, the instruction translator 104 translates a macro-instruction into a first micro-instruction, a second micro-instruction, and at least one intermediate micro-instruction, and marks at least one intermediate binding information on the at least one intermediate micro-instruction. For example, the instruction translator 104 translates a 512-bit macro-instruction into four 128-bit micro-instructions (operation micro-instructions). According to the definition in Table 1, the first micro-instruction is marked by a first binding information (represented by the binary "01", indicating that the first micro-instruction is the first micro-instruction in the program execution order of the macro-instruction), the first intermediate micro-instruction is marked by a first intermediate binding information (represented by the binary "10", indicating that the first intermediate micro-instruction is the second micro-instruction in the program execution order of the macro-instruction), the second intermediate micro-instruction is marked by a second intermediate binding information (represented in binary "10", indicating that the second intermediate micro-instruction is the third micro-instruction in the program execution order of the macro-instruction), and the second micro-instruction represents a second micro-instruction binding information (represented by binary "11", indicating that the second micro-instruction is the last micro-instruction in the program execution order of the macro-instruction). The at least one intermediate micro-instruction is located between the first micro-instruction and the second micro-instruction in the program execution order in the reorder buffer 110. In addition, the first micro-instruction, the at least one intermediate micro-instruction, and the second micro-instruction are adjacent to one another in the micro-instruction storage space. The first binding information, the first intermediate binding information, the second intermediate binding information, and the second binding information represent the fact that the first destination operand of the first micro-instruction, the first intermediate destination operand of the first intermediate micro-instruction, the second intermediate destination operand of the second intermediate micro-instruction, and the second destination operand of the second micro-instruction all point to the same architecture register 126. The first destination operand, the first intermediate destination operand, the second intermediate destination operand and the second destination operand respectively point to the first region, the first intermediate region, the second intermediate region, and the second region of the architecture register 126. The first region, the first intermediate region, the second intermediate region and the second region do not overlap. For example, taking a 512-bit architectural register 126 as an example, the lower 128 bits, the second lower 128 bits, the second higher 128 bits, and the higher 128 bits of the architectural register 126 are the first region, the first intermediate region, the second intermediate region, and the second region (the lower 128 bits, the second lower 128 bits, the second higher 128 bits and the higher 128 bits of the architecture register 126 do not overlap, that is, the first region, the first intermediate region, the second intermediate region, and the second region does not overlap), respectively. The first destination operand points to the first region of the architecture register 126, the first intermediate destination operand points to the first intermediate region of the architecture register 126, and the second intermediate destination operand points to the second intermediate region of the architecture register 126, the second destination operand points to the second region of the architecture register 126.

In another embodiment, when the bit width of the destination operand of the macro-instruction in the instruction execution device 100 is not an integer multiple of the bit width of the destination operand of the micro-instruction, and when the instruction translator 104 translates the macro-instruction into a first micro-instruction, a first intermediate micro-instruction, a second intermediate micro-instruction, and a second micro-instruction, the first destination operand of the first micro-instruction points to the first region of the architecture register 126, the first intermediate destination operand of the first intermediate micro-instruction points to the first intermediate region of the architectural register 126, the second intermediate destination operand of the second intermediate micro-instruction points to the second intermediate region of the architectural register 126, the second destination operand of the second micro-instruction points to the second region of the architecture register 126. Among these 4 regions, any two adjacent regions (for example, the first region is adjacent to the first intermediate region, the first intermediate region is adjacent to the second intermediate region, and the second intermediate region is adjacent to the second region), there may be two relationships: two adjacent regions do not overlap, and two adjacent regions partially overlap. When two adjacent regions do not overlap, there are three situations: the bit width of the two regions is equal, the bit width of the first region is greater than the bit width of the second region, and the bit width of the first region is less than the bit width of the second region. When two regions overlap partially, there are three situations: the bit width of the two regions is equal, the bit width of the first region is greater than that of the second region, and the bit width of the first region is smaller than the bit width of the second region.

In one embodiment, the instruction translator 104 translates other macro-instructions less than or equal to 128 bits into an independent micro-instruction (that is, without forming an atomic operation with other micro-instructions). According to the definition in Table 1, the micro-instruction is marked with the independent binding information (represented by binary "00", indicating that the micro-instruction is an independent micro-instruction of the macro-instruction).

For example, the following Table 2 is used to show an example in which the instruction translator 104 decodes a 256-bit macro-instruction into two 128-bit micro-instructions:

TABLE 2-continued

| macro-instruction | micro-instruction |
| --- | --- |
| ymm3/m256 | xAdd_PD dAVXDest, S1AVXSrc1, S2AVXSrc2, S3DC, S4DC, sz128.128, ns, 11 |

Among them, the macro-instruction is "VADDPD ymm1, ymm2, ymm3/m256" (VADDPD represents the macro-instruction opcode, the same as below; ymm1 represents the destination register, ymm2 and ymm3 represent the first source register and the second source register, respectively, and m256 means the bit width of the operand of VADDPD is 256 bits). The first micro-instruction is "xAdd_PD dSSEDest, S1SSESrc1, S2SSESrc2, S3DC, S4DC, sz128.128, ns, 01" (xAdd_PD represents the micro-instruction opcode, and S3DC means that there is no third source operation, S4DC means that there is no fourth source operand, sz128.128 means that the bit widths of the destination operand and source operand are 128 bits and 128 bits, respectively; ns means an empty field, the same as below; dSSEDest is the destination register, S1SSESrc1 and S2SSESrc2 respectively is the first source register and the second source register, the same as below), "01" means that the first micro-instruction is marked with the first binding information (in this example, the binding information is located at the end of the first micro-instruction, but the present invention is not limited thereto, the binding information can also be located at the beginning or the middle of the micro-instruction, the same below), the second micro-instruction is "xAdd_PD dAVXDest, S1AVXSrc1, S2AVXSrc2, S3DC, S4DC, sz128.128, ns, 11" (dAVXDest is the destination register, S1AVXSrc1 and S2AVXSrc2 are the first source register and the second source register respectively, the same below), "11" means that the second micro-instruction is marked with the second binding information. Since the first micro-instruction is the first micro-instruction in the order of program execution, it is marked with the first binding information. Since the second micro-instruction is the last micro-instruction in the program execution order, it is marked with the second binding information. The destination register dSSEDest of the first micro-instruction and the destination register dAVXDest of the second micro-instruction point to the same architectural register 126.

For another example, the following Table 3 is used to show an example in which the instruction translator 104 decodes a 512-bit macro-instruction into four 128-bit micro-instructions:

| macro-instruction | micro-instructions |
| --- | --- |
| VADDPD zmm1, zmm2, zmm3/m512 | xAdd_PD dSSEDest, S1SSESrc1, S2SSESrc2, S3DC, S4DC, sz128.128, ns, 01 |
| | xAdd_PD dAVXDest, S1AVXSrc1, S2AVXSrc2, S3DC, S4DC, sz128.128, ns, 10 |
| | xAdd_PD dAVX512LDest, S1AVX512LSrc1, S2AVX512LSrc2, S3DC, S4DC, sz128.128, ns, 10 |
| | xAdd_PD dAVX512HDest, S1AVX512HSrc1, S2AVX512HSrc2, S3DC, S4DC, sz128.128, ns, 11 |

TABLE 2

| macro-instruction | micro-instruction |
| --- | --- |
| VADDPD ymm1, ymm2, | xAdd_PD dSSEDest, S1SSESrc1, S2SSESrc2, S3DC, S4DC, sz128.128, ns, 01 |

Among them, the macro-instruction is "VADDPD zmm1, zmm2, zmm3/m512" (zmm1 indicates the destination register, zmm2 and zmm3 indicate the first source register and the second source register respectively, and m512 indicates that the bit width of the operand of VADDPD is 512 bits). The first micro-instruction is "xAdd_PD dSSEDest, S1SSESrc1, S2SSESrc2, S3DC, S4DC, sz128.128, ns, 01", "01" indicates that the first micro-instruction is marked with the first binding information. The first intermediate micro-instruction is "xAdd_PD dAVXDest, S1AVXSrc1, S2AVXSrc2, S3DC, S4DC, sz128.128, ns, 10", "10" indicates that the first intermediate micro-instruction is marked with the first intermediate binding information. The second intermediate micro-instruction is "xAdd_PD dAVX512LDest, S1AVX512LSrc1, S2AVX512LSrc2, S3DC, S4DC, sz128.128, ns, 10" (dAVX512LDest is the destination register, S1AVX512LSrc1 and S2AVX512LSrc2 are the first source register and the second source register respectively), "10" indicates that the second intermediate micro-instruction is marked with the second intermediate binding information. The second micro-instruction is "xAdd_PD dAVX512HDest, S1AVX512HSrc1, S2AVX512HSrc2, S3DC, S4DC, sz128.128, ns, 11" (dAVX512LDest is the destination register, S1AVX512HSrc1 and S2AVX512HSrc2 are the first source register and the second source register respectively), "11" indicates that the second micro-instruction is marked with the second binding information. Since the first micro-instruction is the first micro-instruction in the program execution order, it is marked with the first binding information. Since the first intermediate micro-instruction and the second intermediate micro-instruction are micro-instructions in an intermediate position of the program execution order, they are marked with intermediate binding information. Since the second micro-instruction is the last micro-instruction in the program execution order, the second micro-instruction is marked with the second binding information.

In this way, the reorder buffer 110, the execution unit 112 or other processing units can find all micro-instructions belonging to an atomic operation according to the binding information and the position of the micro-instruction in the reorder buffer 110 (the details are described below).

In one embodiment, after the instruction translator 104 translates the macro-instructions into micro-instructions, it sends the micro-instructions to the register alias table 106 in the order of program execution. The register alias table 106 then sends these micro-instructions to the reorder buffer 110 and the reservation station 108. The reorder buffer 110 sequentially stores these micro-instructions in the corresponding reorder buffer entry in the order of program execution, and the micro-instructions that need to be executed firstly according to the program execution order are stored in the first free reorder buffer entry. For example, when the instruction translator 104 translates the macro-instruction into the first micro-instruction and the second micro-instruction, the first micro-instruction is stored in the reorder buffer entry ROB entry 1, and the second micro-instruction is stored in the reorder buffer entry ROB entry 2. In addition, when the instruction translator 104 translates the macro-instruction into the first micro-instruction, the first intermediate micro-instruction, the second intermediate micro-instruction, and the second micro-instruction, the first micro-instruction is stored in the reorder buffer entry ROB entry 1, the first intermediate micro-instruction is stored in the reorder buffer entry ROB entry 2, the second intermediate micro-instruction is stored in the reorder buffer entry ROB entry 3, and the second micro-instruction is stored in the reorder buffer entry ROB entry 4.

Then, the instruction execution device 100 executes step 650.

In step 650, the reorder buffer 110 simultaneously retires the first micro-instruction and the second micro-instruction according to the first binding information and the second binding information. Specifically, after the execution unit 112 executes the first micro-instruction and the second micro-instruction, the reorder buffer 110 can determine that the first micro-instruction and the second micro-instruction belong to the same atomic operation based on the first binding information, the second binding information, and the storage position of the first micro-instruction and second micro-instruction in the reorder buffer 110. Since macro-instructions are translated into micro-instructions, the translated micro-instructions will be stored in consecutive (i.e. adjacent) reorder buffer entries. Therefore, only when the first micro-instruction and the second micro-instruction is stored in the adjacent reorder buffer entries in the reorder buffer 110, and the reorder buffer entries storing the first micro-instruction is before the reorder buffer entry storing the second micro-instruction (when storing micro-instructions in the reorder buffer 110, the micro-instructions that were stored firstly are placed before the micro-instructions stored latterly, the same as below), and the first micro-instruction and the second micro-instruction belong to an atomic operation. For example, when the first micro-instruction and the second micro-instruction are respectively stored in the reorder buffer entries ROB entry 1 and ROB entry 2 of the reorder buffer 110 (ROB entry 1 is before ROB entry 2, that is, when the reorder buffer entries of the reorder buffer 110 are all free, the first micro-instruction that was stored firstly will be stored in ROB entry 1, and the second micro-instruction that was stored latterly will be stored in ROB entry 2), and when the binding information of the first micro-instruction and the second micro-instruction are 01 and 11, respectively, it means that the first micro-instruction and the second micro-instruction belong to the same atomic operation. When the first micro-instruction does not produce a first execution result, or the second micro-instruction does not produce a second execution result, the first micro-instruction and the second micro-instruction are not retired. When the reorder buffer 110 finds that the first micro-instruction and the second micro-instruction have been executed, the execution result is valid, and the first micro-instruction is the oldest micro-instruction in the reorder buffer 110 (that is, after all macro-instructions before the macro-instruction corresponding to the first micro-instruction and the second micro-instruction are retired), the reorder buffer 110 will retire the first micro-instruction and the second micro-instruction at the same time (this is described in detail below in conjunction with FIGS. 7A-7B). Otherwise, the reorder buffer 110 will not retire the first micro-instruction and the second micro-instruction. After the first micro-instruction and the second micro-instruction are retired, the reorder buffer 110 updates the first execution result and the second execution result to the architecture register 126. The first execution result is generated by executing the first micro-instruction, and the second execution result is generated by executing the second micro-instruction. The specific technical details of updating the first execution result and the second execution result to the architecture register 126 have been described in the foregoing, and will not be repeated here.

Figure 7A:
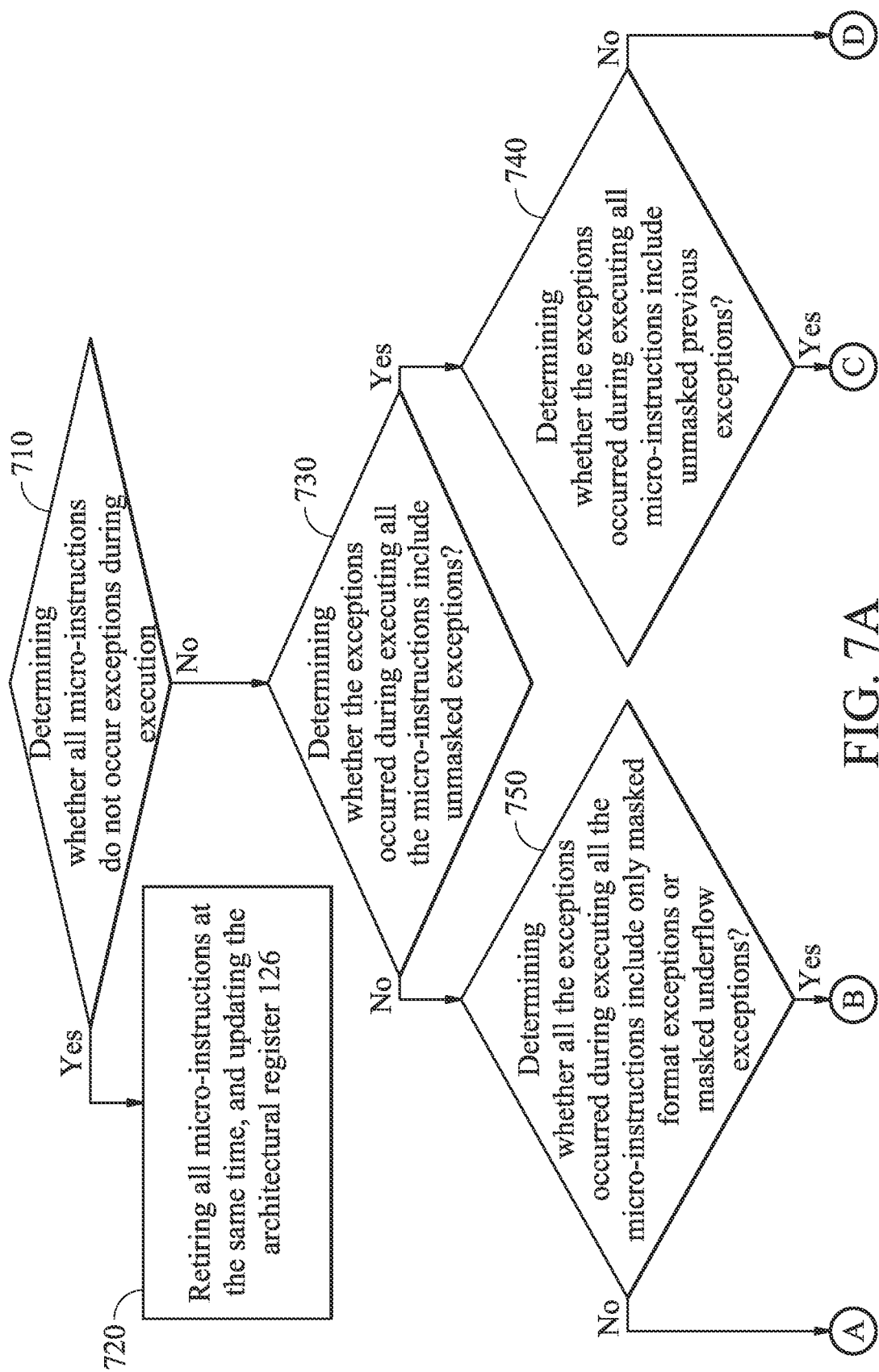
FIGS. 7A-7B are flowcharts of a micro-instruction retire method 700 in accordance with one embodiment of the present disclosure.
Figure 7B:
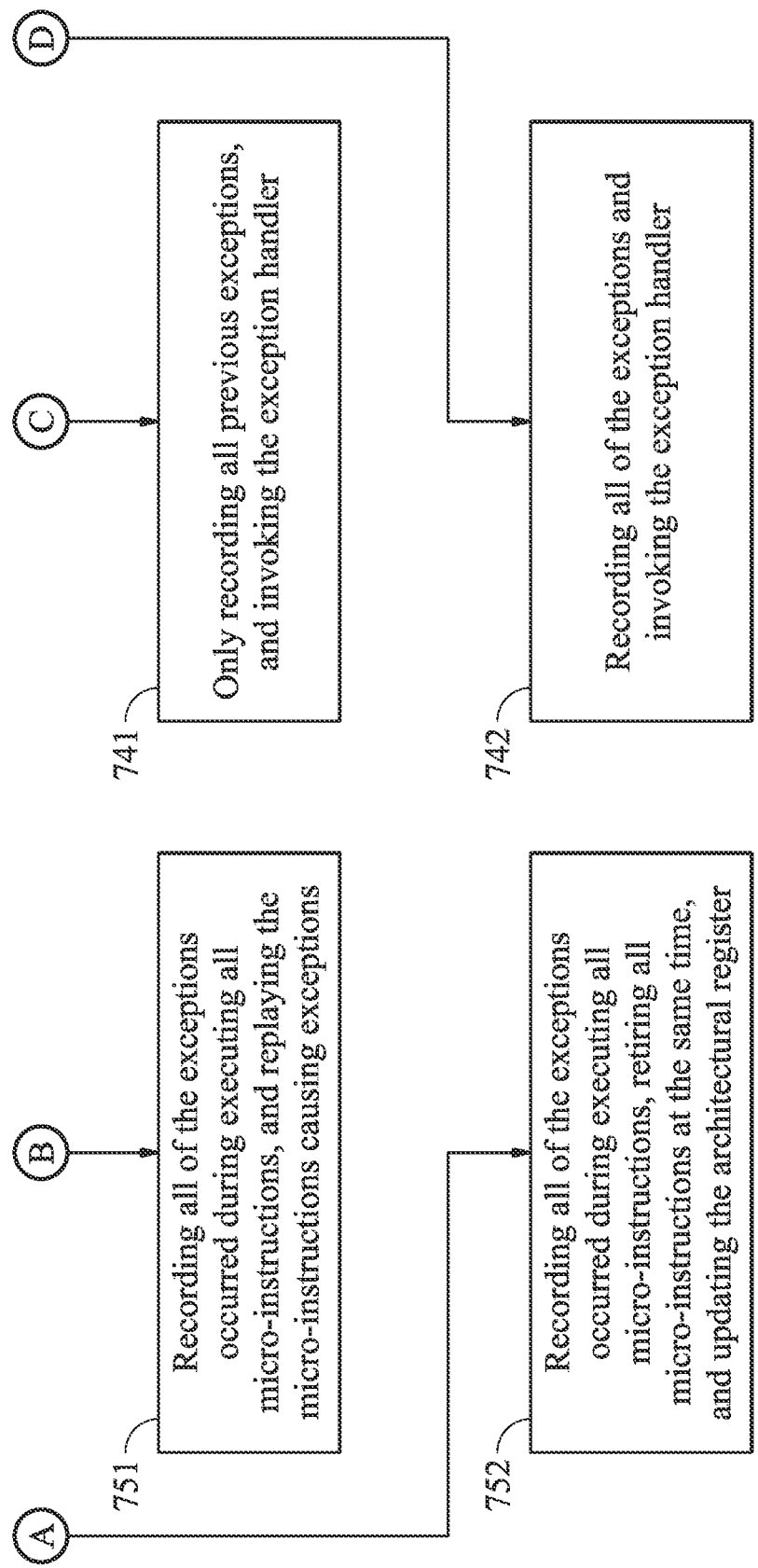

Now please refer to FIGS. 7A-7B. FIGS. 7A-7B are flowcharts of a micro-instruction retire method 700 in accordance with one embodiment of the present disclosure. Specifically, FIGS. 7A to 7B are the detailed flow of step 650 of the instruction execution method 600 in FIG. 6. FIGS. 7A to 7B are described by translating one macro-instruction into four operation micro-instructions as an example (that is, one macro-instruction is translated into the first micro-instruction, the first intermediate micro-instruction, the second intermediate micro-instruction and the second micro-instruction, these four micro-instructions are stored in the adjacent reorder buffer entries in the reorder buffer 110. The reorder buffer entry storing the first micro-instruction is before the reorder buffer entry storing the first intermediate micro-instruction, the reorder buffer entry storing the first intermediate micro-instruction is before the reorder buffer entry storing the second intermediate micro-instruction, the reorder buffer entry storing the second intermediate micro-instruction is before the reorder buffer entry storing the second micro-instruction). The step 710 is performed firstly.

In step 710, the reorder buffer 110 determines whether all micro-instructions do not occur exceptions during execution. For example, a macro-instruction is translated into a first micro-instruction, a first intermediate micro-instruction, a second intermediate micro-instruction, and a second micro-instruction. The reorder buffer 110 determines whether all of the first micro-instruction, the first intermediate micro-instruction, the second intermediate micro-instruction, and the second micro-instruction do not occur exceptions. If there are no exceptions occurred during the execution of the first micro-instruction, the first intermediate micro-instruction, the second intermediate micro-instruction, and the second micro-instruction, the step 720 is performed. Otherwise, the step 730 is performed.

In step 720, the reorder buffer 110 retires all micro-instructions at the same time (that is, clears all the ROB entries of the corresponding micro-instructions), and updates the architectural register 126. For example, taking translating a macro-instruction into the first micro-instruction, the first intermediate micro-instruction, the second intermediate micro-instruction, and the second micro-instruction as an example, when there is no exception occurred during the execution of the first micro-instruction, the first intermediate micro-instruction, the second intermediate micro-instruction and the second micro-instruction, the reorder buffer 110 simultaneously retire the first micro-instruction, the first intermediate micro-instruction, the second intermediate micro-instruction, and the second micro-instruction (that is, cleaning the reorder buffer entries ROB entry 1, ROB entry 2, ROB entry 3, and ROB entry 4 corresponding to the first micro-instruction, the first intermediate micro-instruction, the second intermediate micro-instruction, and the second micro-instruction, respectively). The execution results of the first micro-instruction, the first intermediate micro-instruction, the second intermediate micro-instruction, and the second micro-instruction are updated to the architecture register 126. Taking translating a macro-instruction into the first micro-instruction and the second micro-instruction as an example, when the first micro-instruction and the second micro-instruction do not occur exceptions, the reorder buffer 110 retire (that is, cleaning the reorder buffer entries ROB entry 1, ROB entry 2 corresponding to the first micro-instruction and second micro-instruction) the first micro-instruction and the second micro-instruction at the same time. The execution results of the first micro-instruction and the second micro-instruction are updated to the architecture register 126.

In step 730, the reorder buffer 110 determines whether the exceptions occurred during executing all the micro-instructions (referring to all the micro-instructions translated from the same macro-instruction, the same as below) includes unmasked exceptions (unmasked exceptions refer to exceptions that the instruction processing device 100 must deal with, including unmasked previous exceptions and unmasked post exceptions; for example, unmasked previous exceptions include unmasked format exceptions, unmasked invalid exceptions, and unmasked divide zero exceptions, etc.; unmasked post exceptions include unmasked precision exceptions, unmasked underflow exceptions, and unmasked overflow exceptions; the same as below). For example, taking translating a macro-instruction into a first micro-instruction, a first intermediate micro-instruction, a second intermediate micro-instruction, and a second micro-instruction as an example, the reorder buffer 110 determines whether an unmasked exception is included in the exceptions occurred during executing the first micro-instruction, the first intermediate micro-instruction, the second intermediate micro-instruction, and the second micro-instruction. For example, when an unmasked precision exception occurred during executing the first micro-instruction, a maskable invalid exception occurred during executing the first intermediate micro-instruction, and no exception occurred during executing the second intermediate micro-instruction and the second micro-instruction, all the exceptions that occurred during executing all the micro-instructions include the unmasked precision exception, the maskable invalid exception, so the determination result is yes. When the first micro-instruction does not occur an exception, the first intermediate micro-instruction occurs a maskable invalid exception, the second intermediate micro-instruction and the second micro-instruction do not occur exceptions, all the exceptions that occurred during executing all the micro-instructions only include the maskable invalid exception, so the determination result is no. Those skilled in the art can enumerate other circumstances under which exceptions occur, which will not be listed here. If the determination result is yes, the step 740 is performed. Otherwise, the step 750 is performed.

In step 740, the reorder buffer 110 determines whether all the exceptions occurred during executing all the micro-instructions include unmasked previous exceptions. For example, taking translating a macro-instruction into a first micro-instruction, a first intermediate micro-instruction, a second intermediate micro-instruction, and a second micro-instruction as an example, the reorder buffer 110 determines whether the unmasked previous exception is included in all of the exceptions occurred during executing the first micro-instruction, the first intermediate micro-instruction, the second intermediate micro-instruction, or the second micro-instruction. For example, when a unmasked format exception occurs during executing the first micro-instruction, a masked invalid exception occurs during executing the first intermediate micro-instruction, a precision exception occurs during executing the second intermediate micro-instruction (a masked precision exception or a unmasked precision exception), and the second micro-instruction does not occur exceptions, all of the exceptions occurred during executing these micro-instructions include unmasked format exceptions (belonging to unmasked previous exceptions) and masked invalid exceptions, so the determination result is yes. When the first micro-instruction does not occur exception, the first intermediate micro-instruction occurs a masked invalid exception, the second intermediate micro-instruction, and the second micro-instruction do not occur exceptions, all the micro-instruction exceptions include masked invalid exception, so the determination result is no. Those skilled in the art can enumerate other circumstances where exceptions occur, which will not be listed here. If the determination result is yes, the step 741 is performed. Otherwise, (that is, when unmasked post exception that occurred during executing the first micro-instruction or the second micro-instruction), the step 742 is performed.

In step 741, the reorder buffer 110 only records all previous exceptions, and invokes the exception handler. Specifically, it includes two situations: 1. when all the micro-instructions translated from the macro-instructions only occurs the previous exception, the reorder buffer 110 only records all the previous exceptions in the execution status word 127. 2. In all the micro-instructions translated from the macro-instruction, some micro-instructions occurs the previous exception, and some micro-instructions occurs the post exception, the reorder buffer 110 only records all the previous exceptions in the execution status word 127, without recording any post exceptions. Taking translating a macro-instruction into a first micro-instruction and a second micro-instruction as an example, when an unmasked previous exception (unmask pre exception) occurs during executing one of the first micro-instruction or the second micro-instruction, and when another micro-instruction of the first micro-instruction and/or the second micro-instruction occurs a post exception, the reorder buffer 110 only records all of the previous exceptions occurred during executing the first micro-instruction and/or the second micro-instruction. Taking translating a macro-instruction into the first micro-instruction, the first intermediate micro-instruction, the second intermediate micro-instruction and the second micro-instruction as an example, when an unmasked previous exception occurs during executing any one of the first micro-instruction, the first intermediate micro-instruction, the second intermediate micro-instruction or the second micro-instruction (other micro-instructions may occur the post exception), the reorder buffer 110 only records all previous exceptions occurred during executing the first micro-instruction, the first intermediate micro-instruction, the second intermediate micro-instruction, or the second micro-instruction. Then, the reorder buffer 110 clears all the data in pipeline in the instruction execution device 100 (because the instruction execution device 100 needs to execute the exception handler when the unmasked exception occurs, the currently executing instruction sequence will be interrupted. After the exception handler is executed, the previously interrupted instruction sequence will be executed from the breakpoint; before the exception handler is executed, the instructions in the pipeline are all instructions after the breakpoint. Since the instructions after the breakpoint will be executed again after the exception handler is executed, and the pipeline is also required to execute the exception handler, the pipeline needs to be cleared before executing the exception handler). Then the exception handler is executed to handle all the previous exceptions that occur during executing all micro-instructions. It should be noted that the reorder buffer 110 is only responsible for calling (not executing) the exception handler, the same as below.

In step 742, the reorder buffer 110 records all of the exceptions and invokes the exception handler. Specifically, when the exception that occurs during executing the first micro-instruction or the second micro-instruction includes unmasked post exceptions, the reorder buffer 110 will separately records all the exceptions (or abnormal conditions, for example, all of the exceptions for the first micro-instruction, the first intermediate micro-instruction, the second intermediate micro-instruction, and the second micro-instruction) in the execution status word 127, and clears all the data in pipeline in the instruction execution device 100. Then the exception handler is called to handle all of the exceptions occurred during executing all micro-instructions.

As mentioned above, in step 730, the reorder buffer 110 determines whether all of the exceptions occurred during executing all micro-instructions include unmasked exceptions, and when the result of the determination is no, step 750 is performed.

In step 750, the reorder buffer 110 determines whether all the exceptions occurred during executing all the micro-instructions include only masked format exceptions or masked underflow exceptions (masked exceptions means that the instruction processing device 100 may or may not process them, the same as below). Specifically, the reorder buffer 110 determines whether all of the exceptions occurred during executing the first micro-instruction, the first intermediate micro-instruction, the second intermediate micro-instruction and the second micro-instruction include the masked format exception or the masked underflow exception. If the determination result is yes, the step 751 is performed; otherwise, the step 752 is performed.

In step 751, the reorder buffer 110 records all of the exceptions occurred during executing all micro-instructions, and replays the micro-instructions causing exceptions. For example, the reorder buffer 110 writes all the exceptions occurred during executing the first micro-instruction, the first intermediate micro-instruction, the second intermediate micro-instruction, and the second micro-instruction into the execution status word 127. Then, the micro-instruction where the exception occurred is rewritten into the reservation station 108 for re-execution (for the specific execution flow, see the description of the reservation station 108 and the execution unit 112 in the foregoing, which will not be repeated here). For example, when the first micro-instruction only has a masked format exception, and the first intermediate micro-instruction, the second intermediate micro-instruction and the second micro-instruction do not occur exceptions, the reorder buffer 110 will write the format exception of the first micro-instruction into the execution status word 127. The first micro-instruction is then rewritten into the reservation station 108 to re-execute the first micro-instruction.

In step 752, the reorder buffer 110 records all of the exceptions occurred during executing all micro-instructions, retires all micro-instructions at the same time, and updates the architectural register 126. For example, the reorder buffer 110 writes all of the exceptions occurred during executing the first micro-instruction, the first intermediate micro-instruction, the second intermediate micro-instruction or the second micro-instruction into the execution status word 127. Then, the reorder buffer 110 retires the first micro-instruction, the first intermediate micro-instruction, the second intermediate micro-instruction and the second micro-instruction at the same time, and the execution results of the first micro-instruction, the first intermediate micro-instruction, the second intermediate micro-instruction and the second micro-instruction are written into the architecture register 126.

According to the above description of steps 730, 750, 751, and 752, in step 730, when the determination result is no (that is, when all of the exceptions that occur during executing all micro-instructions do not include unmasked exceptions), the reorder buffer 110 will record all of the exceptions occurred during executing all micro-instructions. That is, in step 730, when the determination result is no, the reorder buffer 110 records all the exceptions that occur during executing the first micro-instruction, the first intermediate micro-instruction, the second intermediate micro-instruction and the second micro-instruction, and writes them into the execution status word 127.

With the above-mentioned instruction execution device 100 and instruction execution method 600 (including the micro-instruction retire method 700), macro-instructions can be decoded into multiple micro-instructions (operation micro-instructions), without the need to generate additional micro-instructions. For example, the above-mentioned instruction execution device 100 and instruction execution method 600 (including the micro-instruction retire method 700) only need to decode a 256-bit macro-instruction into two 128-bit operation micro-instructions (or decode a 512-bit macro-instruction into four 128-bit operation micro-instructions), without the need to generate additional micro-instructions. Therefore, this instruction execution method can reduce the execution time of the instruction execution device 100, thereby reducing power consumption.

The foregoing decoding of one macro-instruction into 2 or 4 micro-instructions is only an example, and the present invention is not limited to thereto. For example, those skilled in the art can also decode a 1024-bit macro-instruction into 8 128-bit operation micro-instructions to achieve the purpose of executing a 1024-bit wide instruction in a 128-bit wide instruction execution device.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An instruction execution method, comprising:
   translating a macro-instruction into a first micro-instruction and a second micro-instruction, and marking first binding information on the first micro-instruction, and marking second binding information on the second micro-instruction; and
   simultaneously retiring the first micro-instruction and the second micro-instruction according to the first binding information and the second binding information;
   wherein the first micro-instruction and the second micro-instruction are adjacent to one another in the micro-instruction storage space.

2. The instruction execution method of claim 1, wherein the first binding information and the second binding information represent a first destination operand of the first micro-instruction and a second destination operand of the second micro-instruction both point to a architecture register.

3. The instruction execution method of claim 2, further comprising:
   when the first micro-instruction and the second micro-instruction do not occur exception, after retiring the first micro-instruction and the second micro-instruction, a first execution result and a second execution result are updated to the architecture register, wherein the first execution result is generated by executing the first micro-instruction, and the second execution result is generated by executing the second micro-instruction.

4. The instruction execution method of claim 2, wherein the first destination operand and the second destination operand respectively point to a first region and a second region of the architecture register, wherein the first region and the second region only partially overlap or do not overlap.

5. The instruction execution method of claim 1, wherein the step of translating the macro-instruction into the first micro-instruction and the second micro-instruction further includes:
   translating the macro-instruction into the first micro-instruction, the second micro-instruction, and at least one intermediate micro-instruction, and marking at least one intermediate binding information on the at least one intermediate micro-instruction,
   wherein the at least one intermediate micro-instruction is located between the first micro-instruction and the second micro-instruction according to the program execution order, and the first micro-instruction, the at least one intermediate micro-instruction and the second micro-instruction are adjacent to one another.

6. The instruction execution method of claim 1, wherein the first binding information indicates that the first micro-instruction is the first micro-instruction of the macro-instruction in the program execution order, and the second binding information indicates that the second micro-instruction is the last micro-instruction of the macro-instruction in the program execution order.

7. The instruction execution method of claim 1, wherein when the first micro-instruction does not generate a first execution result, or the second micro-instruction does not generate a second execution result, the first micro-instruction and the second micro-instruction are not retired.

8. The instruction execution method of claim 1, wherein the micro-instruction storage space is a reorder buffer, wherein the reorder buffer entry storing the first micro-instruction is adjacent to the reorder buffer entry storing the second micro-instruction in the reorder buffer, and the reorder buffer entry storing the first micro-instruction is before the reorder buffer entry storing the second micro-instruction.

9. The instruction execution method of claim 1, wherein when one micro-instruction of the first micro-instruction and the second micro-instruction occurs an unmasked previous exception, and another micro-instruction of the first micro-instruction and the second micro-instruction occurs a post exception, only all previous exceptions occurred during the execution of the first micro-instruction or the second micro-instruction are recorded.

10. The instruction execution method of claim 9, wherein all previous exceptions that occurred during the execution of the first micro-instruction or the second micro-instruction are recorded in an execution status word.

11. The instruction execution method of claim 1, wherein when exceptions occurred during the execution of the first micro-instruction or the second micro-instruction comprise an unmasked previous exception, the instruction execution method further comprises:
    recording all previous exceptions that occurred during the execution the first micro-instruction or the second micro-instruction; and
    invoking an exception handler to handle all previous exceptions occurred during the execution of the first micro-instruction or the second micro-instruction.

12. The instruction execution method of claim 1, wherein when exceptions that occurred during the execution of the first micro-instruction or the second micro-instruction comprise an unmasked post exception, the instruction execution method further comprises:
    recording all exceptions that occurred during the execution of the first micro-instruction or the second micro-instruction; and invoking an exception handler to handle all of the exceptions occurred during the execution of the first micro-instruction or the second micro-instruction.

13. An instruction execution device, comprising:
an instruction translator, configured to translate a macro-instruction into a first micro-instruction and a second micro-instruction, and mark first binding information on the first micro-instruction, and mark second binding information on the second micro-instruction; and
a reorder buffer, configured to simultaneously retire the first micro-instruction and the second micro-instruction according to the first binding information and the second binding information;
wherein the first micro-instruction and the second micro-instruction are adjacent to one another in the micro-instruction storage space.

14. The instruction execution device of claim 13, wherein the first binding information and the second binding information represent the first destination operand of the first micro-instruction and the second destination operand of the second micro-instruction both point to a architecture register.

15. The instruction execution device of claim 14, wherein when the first micro-instruction and the second micro-instruction do not occur exception, after retiring the first micro-instruction and the second micro-instruction, a first execution result and a second execution result are updated to the architecture register, wherein the first execution result is generated by executing the first micro-instruction, and the second execution result is generated by executing the second micro-instruction.

16. The instruction execution device of claim 14, wherein the first destination operand and the second destination operand respectively point to a first region and a second region of the architecture register, wherein the first region and the second region only partially overlap or do not overlap.

17. The instruction execution device of claim 13, wherein the step of translating the macro-instruction into the first micro-instruction and the second micro-instruction using the instruction translator further includes:
translating the macro-instruction into the first micro-instruction, the second micro-instruction, and at least one intermediate micro-instruction, and marking the at least one intermediate binding information on the at least one intermediate micro-instruction,
wherein the at least one intermediate micro-instruction is located between the first micro-instruction and the second micro-instruction according to the program execution order, and the first micro-instruction, the at least one intermediate micro-instruction and the second micro-instruction are adjacent to one another.

18. The instruction execution device of claim 13, wherein the first binding information indicates that the first micro-instruction is the first micro-instruction of the macro-instruction in the program execution order, and the second binding information indicates that the second micro-instruction is the last micro-instruction of the macro-instruction in the program execution order.

19. The instruction execution device of claim 13, wherein when the first micro-instruction does not generate a first execution result, or the second micro-instruction does not generate a second execution result, the first micro-instruction and the second micro-instruction are not retired.

20. The instruction execution device of claim 13, wherein the micro-instruction storage space is a reorder buffer, wherein the reorder buffer entry storing the first micro-instruction is adjacent to the reorder buffer entry storing the second micro-instruction in the reorder buffer, and the reorder buffer entry storing the first micro-instruction is before the reorder buffer entry storing the second micro-instruction.

21. The instruction execution device of claim 13, wherein when one micro-instruction of the first micro-instruction and the second micro-instruction occurs an unmasked previous exception, and another micro-instruction of the first micro-instruction and the second micro-instruction occurs a post exception, only occurrences of previous exception in the first micro-instruction or the second micro-instruction are recorded.

22. The instruction execution device of claim 21, wherein all previous exceptions that occurred during the execution of the first micro-instruction or the second micro-instruction are recorded in an execution status word.

23. The instruction execution device of claim 13, wherein when exceptions occurred during the execution of the first micro-instruction or the second micro-instruction comprise an unmasked previous exception, the reorder buffer records all previous exceptions that occurred during the execution of the first micro-instruction or the second micro-instruction; and invokes an exception handler to handle all previous exceptions occurred during the execution of the first micro-instruction or the second micro-instruction.

24. The instruction execution device of claim 13, wherein when exceptions that occurred during the execution of the first micro-instruction or the second micro-instruction comprise an unmasked rear exception, the reorder buffer records all of the exceptions that occurred during the execution of the first micro-instruction or the second micro-instruction, and invokes an exception handler to handle all of the exceptions occurred during the execution of the first micro-instruction or the second micro-instruction.

* * * * *